April 7, 1964        J. A. PAULI        3,128,068

PETAL TYPE DOOR FOR CARGO AIRCRAFT

Filed Nov. 9, 1962        3 Sheets-Sheet 1

*INVENTOR.*
JULIUS A. PAULI

BY

*Agent*

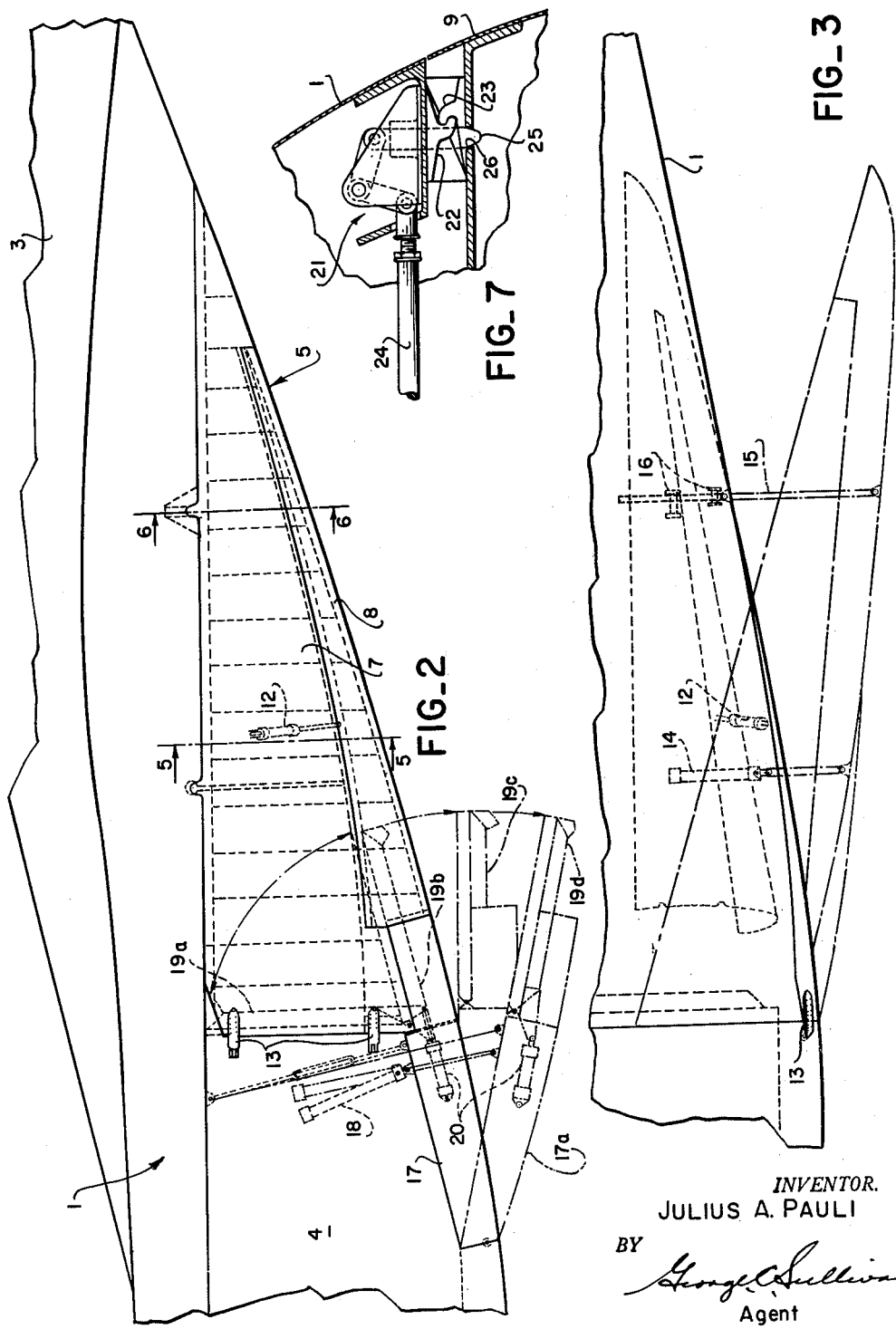

April 7, 1964 J. A. PAULI 3,128,068
PETAL TYPE DOOR FOR CARGO AIRCRAFT
Filed Nov. 9, 1962 3 Sheets-Sheet 3

INVENTOR.
JULIUS A. PAULI
BY
*George C. Sullivan*
Agent

United States Patent Office 3,128,068
Patented Apr. 7, 1964

3,128,068
PETAL TYPE DOOR FOR CARGO AIRCRAFT
Julius A. Pauli, Marietta, Ga., assignor to Lockheed
Aircraft Corporation, Burbank, Calif.
Filed Nov. 9, 1962, Ser. No. 236,513
3 Claims. (Cl. 244—129)

This invention relates to cargo aircraft doors, and more particularly to a cargo door opening for an aircraft that is highly aerodynamically efficient when closed in flight, and yet which is capable of being opened during flight so as to provide complete unobstruction by the door of the entire effective cross-sectional area of the cargo hold without creating excessive aerodynamic drag during flight.

In modern day high speed cargo aircraft it is most desirable to combine aerodynamic efficiency with versatility in cargo opening doors so as to provide substantially straight in loading and unloading of cargo on the ground and still provide the versatility to have the capability of operating such cargo opening doors while in flight to permit aerial delivery of cargo loads as large as the effective cross-sectional area of the cargo compartment, while at the same time resulting in a minimum of aerodynamic drag occasioned by the opening of the cargo doors during flight as well as achieving a minimum of aerodynamic drag when the doors are completely closed during flight.

Additional features and benefits can be attained from such cargo opening doors if they are arranged to protrude externally of the normal fuselage compartment lines a sufficient amount to cause some aerodynamic drag during flight without necessarily exposing the cargo compartment to the ambient air pressure or conditions. Because of the drag resulting from such protrusion, these doors can provide a speed brake function to the aircraft to be used during approach and landing of the aircraft for decrease of the landing speed and distance. Thus, such doors can take the place of or supplement other means of reducing landing speed and distance such as wheel brakes, thrust reversers, reverse pitch propellers, drag chutes, or other mechanical means designed for braking only. By foldably arranging such doors, excessive speed brake and/or aerial delivery drags are avoided while still providing capabilities for aerial delivery of maximum size cargo loads. Furthermore, such foldable arrangement can decrease the risk or exposure to door damage during ground loading or unloading operations caused by vehicles or other cargo handling devices. Likewise, the unique arrangement of the doors in this invention enables the fuselage to retain the smooth, curved lines that reduce the air drag on the aircraft in flight as the doors, when closed, are arranged in such a way to provide low drag shape to the aft fuselage which in turn increases speed, as well as range for an equivalent amount of fuel.

Accordingly, it is an object of this invention to provide a petal type opening door on an aircraft fuselage, which when open, permits easy straight in loading or unloading from either truck bed height or directly from the ground.

Another object of this invention is to provide a petal type opening door on an aircraft fuselage that is capable of being opened during flight for the purpose of unloading cargo of large dimensions when aerial delivery is desired.

A further object of this invention is to provide a petal type door capable of minimizing air loads resulting from aerodynamic forces when the door is open sufficiently to permit access to the full cross-sectional dimensions of the cargo compartment.

A still further object of this invention is to provide a petal type door that can be opened during flight and during landing of the aircraft to extend externally of the normal fuselage contour, thereby providing a speed brake capability.

Another object of this invention is to provide a petal type door, which, when closed, provides a clean, low drag, closure fairing for the fuselage.

Yet a still further object of this invention is to provide a petal type door which is operated by relatively simple mechanical means and, when opened in flight, presents a compact surface in relation to the airflow, eliminating an unstable protrusion.

Further objects and advantages of this invention will become apparent from the following description taken in connection with the accompanying drawings showing one embodiment of the invention in which:

FIGURE 2 is a side elevational view of the aft portion of the aircraft in FIGURE 1, showing the doors in closed position by solid lines and various open positions by phantom lines;

FIGURE 3 is a partial plan view showing one of the petal-type doors in closed position by solid lines and in opened position by phantom lines;

FIGURE 7 is an enlarged detailed view of area A of FIGURE 5.

Figure 1:
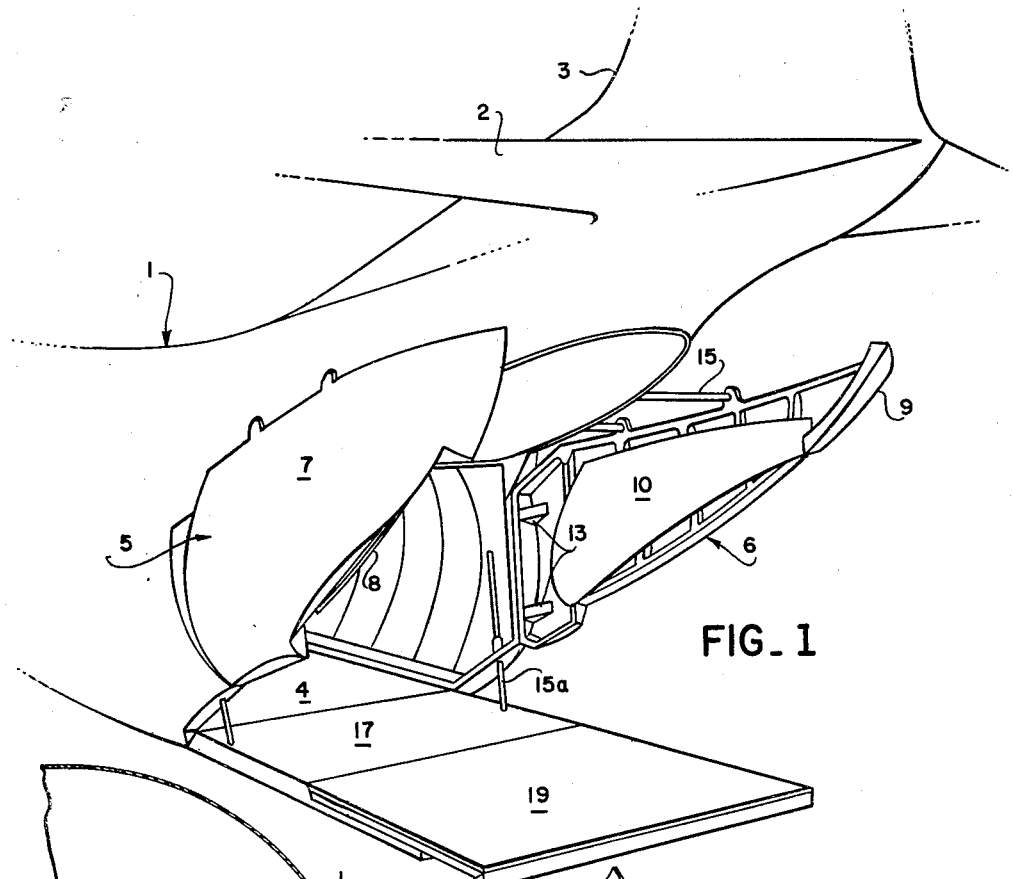
FIGURE 1 is a partial perspective view of the aft portion of a cargo aircraft employing rear on-off loading, with access doors to the interior of the cargo compartment shown in open position.

Generally stated, the depicted embodiment of the invention has a pair of aircraft fuselage door assemblies of substantially triangular plan form having forward, upper and lower edges. Each of the pair of door assemblies includes an upper and lower panel member so arranged that each lower panel member will fold upwardly so as to lie substantially coextensive with the upper panel member on the inner side thereof.

The forward edge of the upper panel is pivotally connected to the aircraft fuselage in such a manner that the trailing edge of each door assembly will swing about this pivotal connection in an outward direction so that the trailing edges of the door assemblies swing away from each other in an opening direction and toward each other in a closing direction, the lower panel members swinging upwardly to lie along the inner surface of the upper panels while the door assemblies are opening, and vice versa, swinging downwardly when the door assemblies move in a closing direction, the opposing edges of the lower panel members coming into abutment when the door assemblies are in their completely closed position.

Referring more specifically to FIGURES 1 through 6, there is shown an aft fuselage portion 1 of an aircraft having horizontal and vertical tail members 2 and 3 respectively. A rear opening into cargo compartment 4 is formed by a pair of door assemblies 5 and 6; door assembly 5 having an upper panel member 7 and a lower panel member 8, while door assembly 6 has an upper panel member 9 and a lower panel member 10. The lower panel members 8 and 10 are each respectively connected to their upper panel members 7 and 9 through any appropriate hinge arrangement 11 as can best be seen in FIGURES 5 and 6. The lower door panels 8 and 10 are arranged so that they can be swung in an upward, inward direction about their hinges 11 to the position identified as 10a for door 10 in FIGURES 5 and 6 by any appropriate actuating means such as actuator 12 for door assembly 6 as can best be seen in FIGURES 3 and 5. In this inward position lower panel member 10 lies substantially coextensive with upper panel member 9 with the inner sides of panel members 9 and 10 in confrontation.

While the references to the drawings for the details just described are only shown for door assembly 6, it is to be understood that the same description is applicable to door assembly 5 whose details are the same as those for door assembly 6.

Figures 5, 6:
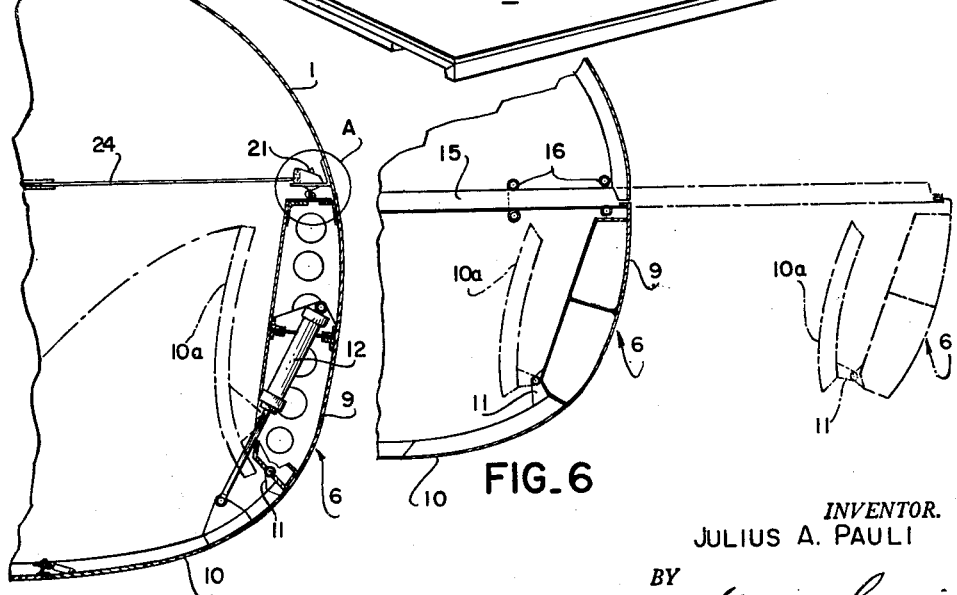
FIGURE 5 is a view taken along line 5—5 of FIGURE 2.
FIGURE 6 is a view taken along line 6—6 of FIGURE 2.
Figure 4:
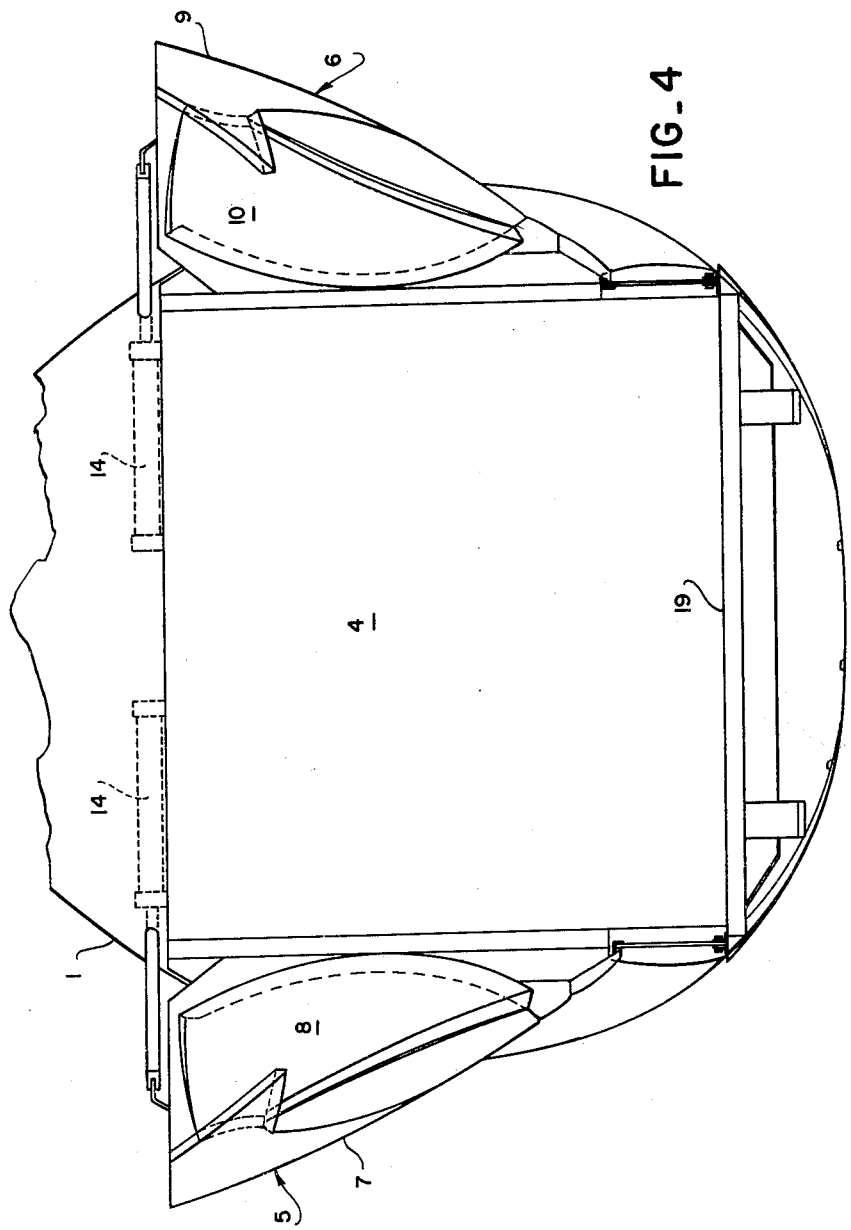
FIGURE 4 is a partial cross-sectional view of the fuselage in elevation when looking forward with the doors in open position.

Each of the upper panel members 7 and 9 are pivotally secured along their forward edges to fuselage 1 by any appropriate hinge devices 13 as can best be seen in FIGURES 1, 2 and 3 so as to provide the door assemblies 5 and 6 to be pivoted about hinges 13 from a closed position as shown in FIGURES 2 and 5 to an open position as shown in FIGURES 1, 3, 4 and 6. Each of the door assemblies 5 and 6 is moved in an opening and closing direction by an actuator 14 (best seen in FIGURES 3 and 4), the movement of the doors in turn supported by a guide rod 15 guidably held and supported in rollers 16 located in the fuselage as best seen in FIGURES 3 and 6.

A ramp door 17 is pivotally connected along its forward edge to the fuselage 1 and controlled by an actuator 18 connected thereto and the fuselage 1 so that upon extension of actuator 18 the trailing edge of the ramp door 17 may be moved to a position where its inner surface is parallel to the floor of cargo compartment 4, such as seen in FIGURE 1, or to a full open position such as shown by position 17a in FIGURE 2. Likewise, a combined ramp extension pressure door 19 may be included, which is similar to the assembly and structure shown in United States Letters Patent 2,942,812, dated June 28, 1960, entitled "Combined Loading Ramp and Interior Pressurization Door for Aircraft" and assigned to the same assignee as this invention. Such a ramp extension-pressure door 19 can serve to effectively seal off the cargo compartment 4 (whether pressurized or not) from the tail section enclosed by door assemblies 5 and 6 when in their closed positions so as to permit door assemblies 5 and 6 to be opened to serve as speed reduction devices during flight and/or landing to be more fully explained hereinafter.

The relative rotation of ramp extension-pressure door 19 relative to ramp door 17 is controlled by an actuator 20 located in ramp 17 which can be controlled from a completely closed position indicated as 19a in FIGURE 2 to a completely open position 19b relative to ramp 17 as indicated in FIGURE 2. In this relative position between door 19 and ramp 17, the opening of ramp 17 to a position substantially parallel with the floor of cargo compartment 4 the ramp extension-pressure door 19 would then assume a position indicated as 19c in FIGURE 2, and upon complete extensions of ramp 17 for ground loading operations less than truck bed height the ramp extensions pressure door 19 would assume a position indicated as 19d in FIGURE 2.

An appropriate lock mechanism as shown in FIGURES 5 and 7 may be incorporated to positively lock the door assemblies 5 and 6 in closed position relative to fuselage 1. The lock mechanism 21 comprises a pair of interlocking lugs 22 and 23 connected to the fuselage and upper panel member 9 respectively so as to be drawn over closure of the door assemblies relative to the fuselage 1. Any appropriately actuated push-pull rod 24 controls a plunger 25 for removal from and insertion into an opening 26 located in the upper panel member 9 thereby restraining lateral movement of upper panel member 9 relative to fuselage 1 in a lateral direction when the plunger 25 is positioned as shown in FIGURE 7.

The operational sequence of the depicted door embodiment upon opening is for the removal of plungers 25 from the openings 26 to release the door assemblies 5 and 6 from their locked positions relative to fuselage 1, this occurring by the movement of the push-pull rods 24 toward the lock mechanisms 21.

Upon unlocking of the doors, the extension of both actuators 14 will pivot both of the door assemblies 5 and 6 around the pivotal connections with the fuselage through hinges 13 thereby moving the aft portions of door assemblies 5 and 6 away from each other in a lateral direction. Shortly after the separation of the confronting edges of lower panel members 8 and 10 and the very aft confronting edges of upper panel members 7 and 9, the actuators 12 are retracted so as to swing the lower panel members 8 and 10 upwardly about hinges 11 to positions as shown in FIGURE 1. In this manner, the opening of door assemblies 5 and 6 can be accomplished in flight to permit aerial delivery of cargo from cargo hold 4 with a minimum of stabilization drag caused by upper panel members 7 and 9 being extended, while at the same time avoiding any obstruction to the entire cross-sectional area of cargo hold 4 as can best be seen in FIGURE 4.

Likewise with the upward retraction of lower panel members 8 and 10 when the doors are opened on the ground, truck bed height loading and unloading can be accomplished with the lower door panel members 8 and 10 swung upwardly and out of the way of any ground vehicles or cargo handling vehicles on the ground, this same feature being available whether the loading and unloading is at truck bed height such as when the ramp extension-pressure door 19 is in the position 19c of FIGURE 2 or whether the ramp 17 is completely lowered to inclined position 17a for loading or unloading directly from the floor of cargo hold 4 to the ground. Additionally, the door assemblies 5 and 6 when extended in a folded position as shown in FIGURE 1 can serve as speed brakes or drag devices for reducing speed in flight or speed on letdown for landing, yet due to the folded positions whereby the lower door panels 8 and 10 are folded upwardly on the interior sides of upper panel members 7 and 9 an excessive amount of drag is not achieved.

While a particular embodiment of the invention has been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. An aft door structure for a cargo aircraft fuselage comprising: a pair of door assemblies each having an upper and lower door panel pivotally connected together and each assembly having an open and closed position, each of said door assemblies having a forward, upper and lower edge when the lower door panel is in its closed position relative to its upper door panel, a first actuating means for pivoting the lower door panels upward and inward relative to its related upper door panel whereby the inner surfaces of the upper and lower door panels are confronting, said upper door panels pivotally connected along the forward edge thereof to the fuselage, and a second actuating means moving the door assemblies about the pivotal connection of the fuselage and forward edge of the upper door panels so as to swing the aft portions of the door assemblies away from each other in an opening direction and to bring the aft portions of the door assemblies toward each other in a closing direction, the movement of the lower door panels relative to the upper door panels in an opening and closing direction occurring concurrently while the upper door panels move about their pivotal connections to the fuselage in an opening or closing direction.

2. An aft door structure for a cargo aircraft as claimed in claim 1 in which the door assemblies are adapted for operation during flight wherein an opening equivalent at least to the cross-sectional area of the cargo hold can be accomplished with a minimum of aerodynamic drag.

3. An aft door structure for a cargo aircraft fuselage comprising: a pair of door assemblies each having an upper and lower door panel pivotally connected together and each assembly having an open and closed position, a first actuating means for pivoting the lower door panels upward and inward relative to its related upper door panel whereby the inner surfaces of the upper and lower door panels are confronting, said upper door panels pivotally connected to the fuselage, and a second actuating means moving the door assemblies about the pivotal connections of the upper door panels to the fuselage, the pivotal connections between the upper door panels and the fuselage arranged so as to swing the aft portions of the door assemblies away from each other in an opening direction and to bring the aft portions of the door assemblies toward each other in a closing direction, the movement of the lower door panels relative to the upper door panels in an opening and closing direction capable of occurring concurrently while the upper door panels move about their pivotal connections to the fuselage in an opening or closing direction.

References Cited in the file of this patent

UNITED STATES PATENTS 2,731,221    Holton _____ Jan. 17, 1956

OTHER REFERENCES

"The Inside Story of the Fairchild Packet," by Fairchild Aircraft, page 9.